(12) United States Patent
Morley

(10) Patent No.: US 8,289,171 B2
(45) Date of Patent: Oct. 16, 2012

(54) METHOD OF PROVIDING CRIME-RELATED SAFETY INFORMATION TO A USER OF A PERSONAL NAVIGATION DEVICE AND RELATED DEVICE

(75) Inventor: Simon Dean Morley, Auckland (NZ)

(73) Assignee: Mitac International Corp., Huei-Shan Hsiang, Tao-Yuan Hsien (TW)

( * ) Notice: Subject to any disclaimer, the term of this patent is extended or adjusted under 35 U.S.C. 154(b) by 359 days.

(21) Appl. No.: 12/684,126

(22) Filed: Jan. 8, 2010

(65) Prior Publication Data

US 2011/0169647 A1 Jul. 14, 2011

(51) Int. Cl.
*G08B 23/00* (2006.01)
(52) U.S. Cl. ............ 340/573.4; 340/539.11; 340/539.13
(58) Field of Classification Search ............... 340/573.4, 340/539.11, 539.13
See application file for complete search history.

(56) References Cited

U.S. PATENT DOCUMENTS

| 7,221,928 | B2* | 5/2007 | Laird et al. ............... 455/404.1 |
| 2001/0004600 | A1 | 6/2001 | Son |
| 2004/0257208 | A1* | 12/2004 | Huang et al. ............... 340/426.1 |
| 2007/0273499 | A1 | 11/2007 | Chlubek |
| 2008/0033644 | A1* | 2/2008 | Bannon ........................ 701/210 |
| 2008/0094230 | A1* | 4/2008 | Mock et al. ................. 340/573.4 |
| 2008/0208469 | A1* | 8/2008 | Obradovich et al. ......... 701/213 |
| 2009/0248643 | A1* | 10/2009 | Wasson ............................. 707/3 |
| 2010/0100319 | A1* | 4/2010 | Trinko et al. ................. 701/212 |
| 2011/0153754 | A1* | 6/2011 | Gunasekara ................. 709/206 |

FOREIGN PATENT DOCUMENTS

DE 10 2005 048 047 A1 4/2007

* cited by examiner

*Primary Examiner* — Jennifer Mehmood
*Assistant Examiner* — Naomi Small
(74) *Attorney, Agent, or Firm* — Winston Hsu; Scott Margo

(57) ABSTRACT

To alert a user of dangerous driving or parking conditions, a personal navigation device for providing a safety notification includes a positioning device for determining position of the personal navigation device, a networking device for receiving safety information corresponding to the position from a safety data server, a display for displaying a user interface and a map, and a processor. The processor generates a query including the position, controls the networking device to send the query to the safety data server, parses the safety information received from the safety data server, and modifies the user interface displayed by the display based on the safety information.

18 Claims, 3 Drawing Sheets

METHOD OF PROVIDING CRIME-RELATED SAFETY INFORMATION TO A USER OF A PERSONAL NAVIGATION DEVICE AND RELATED DEVICE

BACKGROUND OF THE INVENTION

1. Field of the Invention

The present invention relates to personal navigation devices, and more particularly, to a method of providing crime-related safety information to a user of a personal navigation device and related device.

2. Description of the Prior Art

Personal navigation devices (PNDs) utilize navigation satellite signals to determine their immediate location at any point on the Earth with satellite coverage. When location information is further combined with street maps, navigation is possible, such that, even if a user were to deviate from their planned route, the PND could use the immediate location to find the user's current location on the street map, and rechart a course to navigate safely to the user's intended destination.

As the PNDs become more developed, many additional features are included, such as color displays, voice prompts, and point of interest (POI) locators. These advances are brought about by improvements in liquid crystal display (LCD) technology, touch screen technology, storage media, processing speed and efficiency, as well as database development and population. Another important addition to the PND is a network interface module, whether that be in the form of a Bluetooth transceiver connected to a General Packet Radio Service (GPRS) modem, or an integrated 802.11-type transceiver, which allows the PND to access online databases containing information about points of interest that can be cross-referenced to the user's immediate position, or a position along the user's current route to their intended destination.

While the PND provides directions and information about POIs, the user may walk, drive, or park in an unsafe location unknowingly, potentially leading to loss of valuables, or injury to their person. If the user parks in an area with frequent break-ins, the PND may even be lost, not to mention other important or valuable personal effects.

SUMMARY OF THE INVENTION

According to an embodiment, a personal navigation device for providing a safety notification comprises a positioning device for determining position of the personal navigation device, a networking device for receiving safety information corresponding to the position from a safety data server, a display for displaying a user interface comprising a map, and a processor for generating a query comprising the position, controlling the networking device to send the query to the safety data server, parsing the safety information received from the safety data server, and modifying the user interface displayed by the display based on the safety information.

According to an embodiment, a method of activating an alarm in a personal navigation device comprises the personal navigation device querying a safety data server for safety information corresponding to position of the personal navigation device, the personal navigation device receiving the safety information from the safety data server, and the personal navigation device displaying a safety notification in a user interface of the personal navigation device according to the safety information and the position of the personal navigation device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
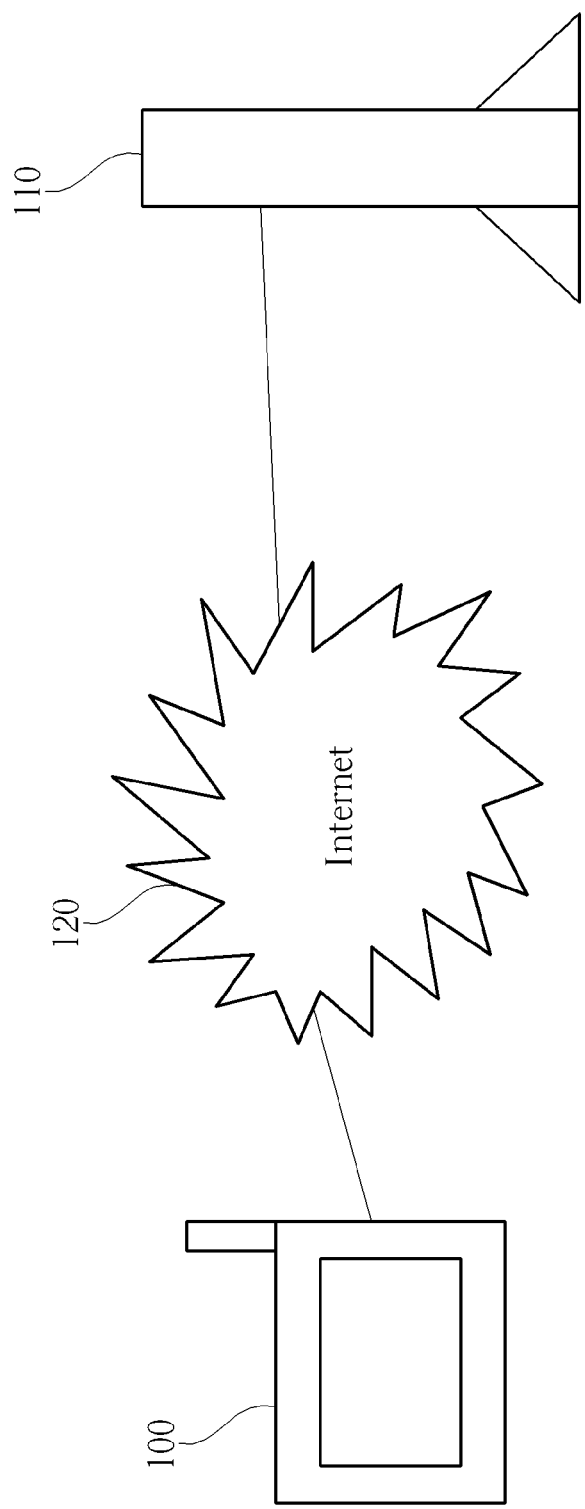
FIG. 1 is a diagram of a personal navigation device and a safety data server.

Please refer to FIG. 1, which is a diagram of a personal navigation device (PND) 100 and a safety data server 110 according to an embodiment. The PND 100 may establish a network connection with the safety data server 110 through a data network 120 for obtaining safety information from the safety data server 110 according to current location of the PND 100. The safety data server 110 may store information about specific safety-related events, e.g. break-ins, thefts, and muggings, or information about general safety trends for the current location of the PND 100. The safety information stored in the safety data server 110 may be correlated with a predetermined geographical range corresponding to the current location. The safety data server 110 may be connected with a police station server, so as to keep the safety data updated. Through a particular relationship (contract), the police station server may release specific information, such as crime location, crime type, crime damages, and crime occurring time, for the safety data server to accumulate data and run statistics for safety events. The safety data server 110 may also store third-party safety ratings or information obtained from a third-party evaluation organization. Safety information may also include information related to safety infrastructure, such as video cameras, neighborhood watch programs, routine patrols, and other types of preventative safety measures that may affect safety level of the surrounding area. The safety data server 110 may also be connected with an insurance claims database, which may have claims data for break-ins, theft, vandalism, or other types of safety-related information for vehicles. Based on all information received from various safety databases, the safety data server 110 may select relevant information to send to the PND 100, or may issue an overall safety level. In an embodiment, the PND 100 may also send a safety incident report to the safety data server 110 through the networking device 103. For example, if the user's automobile is vandalized, the user may send a vandalism report to the safety data server 110 through the networking device 103 including the current location as determined by the positioning device 101.

Figure 2:
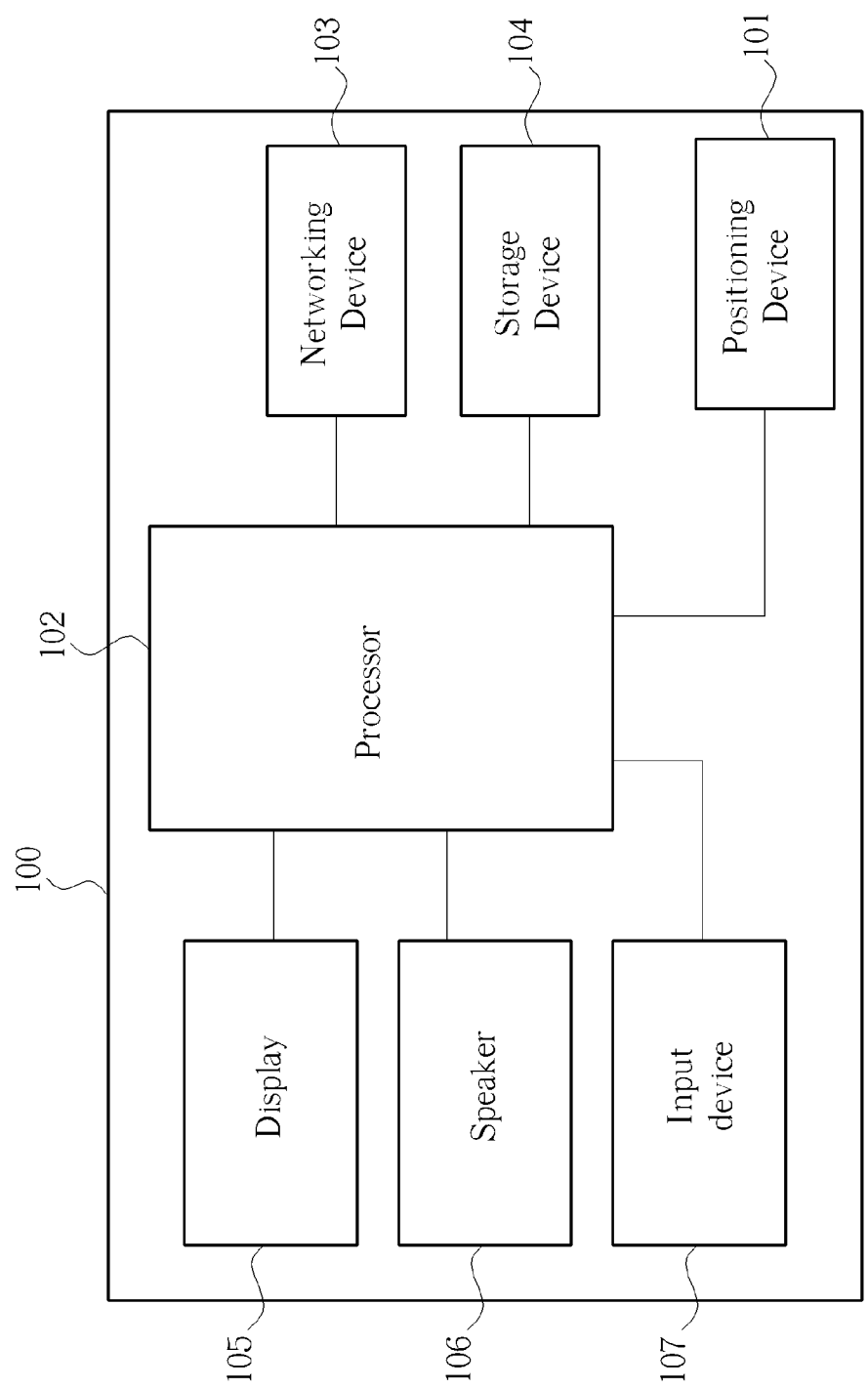
FIG. 2 is a diagram of the personal navigation device of FIG. 1.

Please refer to FIG. 2, which is a diagram showing one embodiment of the personal navigation device 100 of FIG. 1. The personal navigation device 100 may comprise a positioning device 101, a processor 102, a networking device 103, a storage device 104, a display 105, and a speaker 106.

The positioning device 101 may be utilized for determining current position of the personal navigation device, for example by receiving Global Positioning System (GPS) signals and performing triangulation to determine the current position. The positioning device 101 may update the current position frequently to allow a user of the personal navigation device 100 to know the current location of the PND 100 precisely at all times. The current position may be stored in the storage device 104 or in internal circuits of the positioning device 101 or the processor 102.

The processor 102 may receive alerts from the networking device 103 and/or the storage device 104. For example, the processor 102 may control the networking device 103 to send a query to the safety data server 110 comprising the current location from the positioning device 101 to receive a list of recent safety-related events occurring within a predetermined distance, e.g. 500 meters, or number of blocks, e.g. 5 blocks, from the current location. Or, the processor 102 may query the safety data server 110 to obtain a crime level, e.g. red, amber, green, from the safety data server 110 corresponding to the current location. The list of recent events, the crime level, or any other safety-related information may be obtained through the networking device 103, or may be obtained from the storage device 104. For instance, the storage device 104 may be preloaded with a historical list of events, the crime level, or any other safety-related information either at time of manufacture, or through an updating process. The updating process may be performed through the networking device 103 or through a data connection with a personal computer, for example.

Based on the above-mentioned safety-related information, the processor 102 may control the display 106, the speaker 107, or both to alert the user to the events, the crime level, or the other safety-related information corresponding to the current location. The processor 102 may control the display 106 to display a user interface for the user to key-in instructions, allowing the personal navigation device to receive the user's commands. The user interface may comprise input forms for receiving user input, and may also include output regions for providing visual information to the user, including the map, the current position highlighted on the map, the user's route overlaid on the map, the user's current speed, the user's current heading, etc. The processor may modify the user interface for alerting the user to the events, the crime level, or the other safety-related information. For example, the alert processor 102 may modify the map displayed by the display 106 by overlaying the map with different colors corresponding to different safety levels. When the user drives through a low-level crime-rate area, the map may be overlaid with a green color. If an area surrounding the current position is a high-level crime-rate area, the map may be overlaid with a red color. Other images may also be displayed, such as a smiley face or an angry face, with unlimited numbers of variation in between corresponding to the number of different crime levels available. The alert processor 102 may also cause the speaker 107 to output an alarm sound or a voice notification based on the safety-related information. For example, the voice notification may comprise a brief report on types of events, times of events, and proximity of events to the current location. The voice notification may also provide a simple notice to the user, such as "You are currently passing through an area with low safety." In another embodiment, the user may store a safety level threshold in the storage device 104 through a hardware or software interface of the PND 100. The processor 102 may compare the safety level corresponding to the current location to the safety level threshold, may issue an alert, such as a warning message, when the user is about to enter an area where the safety level is lower than the safety level threshold, and may issue a safety message when the user is about to enter an area where the safety level is higher than the safety level threshold. The warning message may be issued when the user is within a safe distance threshold of the area. The safe distance threshold may be a distance, such as 100 meters, 250 meters, etc., and may be set to a default safe distance threshold, and/or may be set by the user.

The processor 102 may operate in different modes to activate the display 106 and/or the speaker 107 as mentioned above according to a number of predetermined conditions. For example, in a first mode, the processor 102 may alert the user anytime the current location is within a high crime level region. In a second mode, the processor 102 may alert the user when a speed of the user is below a predetermined threshold in the high crime level region. For example, if the user is driving, and the user slows down or stops while in the high crime level region, the processor 102 may activate the display 106 to display an alarm image or text, or may activate the speaker 107 to sound an alarm or provide a report. In a third mode, the user may utilize an input device to request the alert processor 102 to give a real-time report on the display 106 or in the speaker 107. In another embodiment, if the user is looking for safe parking, and the current location is in an unsafe area, the processor 102 may locate a safe parking area and recommend the safe parking area to the user through the display 106 or the speaker 107.

The personal navigation device 100 may include different operation modes for different usage cases, e.g. driving, walking, boating, or cycling. The user may select a mode for the PND 100 to operate in through a hardware or software button or menu option, and the PND 100 may provide different navigation instructions based thereon. For example, a pedestrian using the PND 100 in walking mode may traverse one-way streets that a driver using the PND 100 in driving mode may not be able to traverse. Thus, the PND 100 may utilize the different operation modes to provide optimal routing to the user. In an embodiment of the PND 100 described above, the processor 102 may issue a safety notification upon detecting a change in the operation mode, e.g. from driving mode to walking mode or cycling mode. The change may correspond to the user leaving his/her automobile and getting ready to walk or ride to his/her intended destination. At this time, the user may be entering a place of relative vulnerability, making the safety notification of particular importance.

Figure 3:
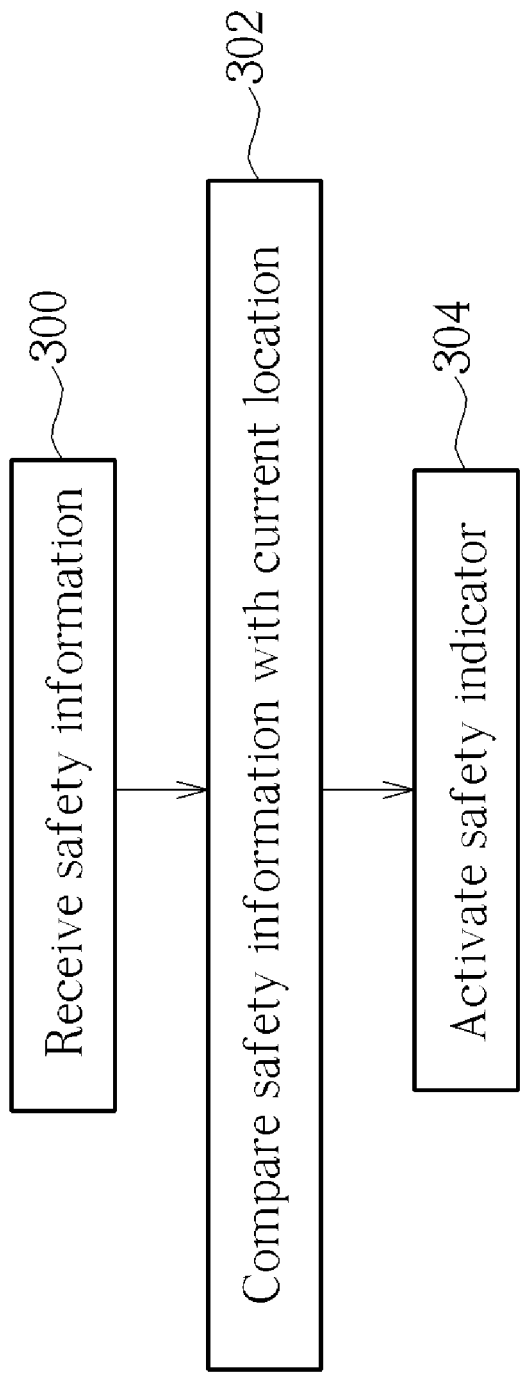
FIG. 3 is a flowchart of a process for activating an alarm in a personal navigation device.

Please refer to FIG. 3, which is a diagram of a process 30 for activating an alarm in a personal navigation device such as the PND 100. The process 30 starts with receiving safety information (Step 300), such as the crime level or events mentioned above. The safety information may be received by connecting to a server through a network, or through a data connection with a computer. The safety information may be stored in a storage device, and received from the storage device. The safety information may also be received in response to a query sent to the server. The safety information may be compared with the current location (Step 302). For example, the safety information may include an event type, an address, and a timestamp. If the address is within a predetermined distance or number of blocks of the current location, a safety indicator may be activated in the personal navigation device (Step 304). The safety indicator may be a visual indicator or a sound. The safety information may also be a crime level, which may be correlated with a range of addresses, or a geographic region. If the current location is within the range of addresses or the geographic region, the safety indicator may be activated in the personal navigation device (Step 304). The safety indicator may also be a "safe" indicator, such as a green icon displayed in a display of the personal navigation device (Step 304). Or, the safe indicator may be a voice notification indicating entry into a safe zone or exit of an unsafe zone.

By utilizing the personal navigation device 100 and the process 30, the user may have peace of mind when driving and parking. Further, with increased adoption of the process 30, the user may be able to negotiate lower insurance premiums if he/she consistently parks in safe parking areas.

Those skilled in the art will readily observe that numerous modifications and alterations of the device and method may be made while retaining the teachings of the invention.

What is claimed is:

1. A personal navigation device for providing a safety notification, the personal navigation device comprising:
    a positioning device for determining position of the personal navigation device;
    a networking device for receiving safety information corresponding to the position from a safety data server;
    a display for displaying a user interface comprising a map; and
    a processor for generating a query comprising the position, controlling the networking device to send the query to the safety data server, parsing the safety information received from the safety data server, and modifying the user interface displayed by the display based on the safety information when speed of the personal navigation device is below a predetermined threshold while the personal navigation device is located in a high crime level region.

2. The personal navigation device of claim 1, further comprising:
    a storage element for storing the safety information and the map.

3. The personal navigation device of claim 1, wherein the storage element further stores a safety level threshold, and the processor modifies the user interface displayed by the display based on the safety information and the safety level threshold.

4. The personal navigation device of claim 3, wherein the safety information comprises a safety level, and the processor modifies the user interface displayed by the display when the safety level is lower than the safety level threshold.

5. The personal navigation device of claim 4, wherein the processor controls the display to issue an alert when the position is within a safety distance threshold away from an area having the safety level lower than the safety level threshold.

6. The personal navigation device of claim 3, wherein the safety information comprises a safety level, and the processor modifies the user interface displayed by the display when the safety level is higher than the safety level threshold.

7. The personal navigation device of claim 4, wherein the processor controls the display to issue a safety message when the position is within a safety distance threshold away from an area having the safety level higher than the safety level threshold.

8. The personal navigation device of claim 1, further comprising:
    an input device for receiving a safety notification request from a user, and sending the safety notification request to the processor;
    wherein the processor receives the safety notification request;
    wherein generating the query comprising the position and controlling the networking device to send the query to the safety data server is based on the safety notification request.

9. The personal navigation device of claim 1, wherein the processor further detects a change in mode of the personal navigation device from driving mode to walking mode, and modifying the user interface displayed by the display based on the safety information is performed upon detection of the change.

10. A method of activating an alarm in a personal navigation device, the method comprising:
    the personal navigation device querying a safety data server for safety information corresponding to position of the personal navigation device;
    the personal navigation device receiving the safety information from the safety data server; and
    the personal navigation device displaying a safety notification in a user interface of the personal navigation device according to the safety information when speed of the personal navigation device is below a predetermined threshold while the personal navigation device is located in a high crime level region.

11. The method of claim 10, further comprising the personal navigation device storing the safety information on a storage element of the personal navigation device.

12. The method of claim 10, further comprising:
    the storage element further storing a safety level threshold; and
    a processor of the personal navigation device modifying the user interface displayed by the display based on the safety information and the safety level threshold.

13. The method of claim 12, wherein the safety information comprises a safety level, the method further comprising the processor modifying the user interface displayed by the display when the safety level is lower than the safety level threshold.

14. The method of claim 13, wherein the processor modifying the user interface displayed by the display when the safety level is lower than the safety level threshold is the processor controlling the display to issue an alert when the position is within a safety distance threshold away from an area having the safety level lower than the safety level threshold.

15. The method of claim 12, wherein the safety information comprises a safety level, the method further comprising the processor modifying the user interface displayed by the display when the safety level is higher than the safety level threshold.

16. The method of claim 13, wherein the processor modifying the user interface displayed by the display when the safety level is higher than the safety level threshold is the processor controlling the display to issue a safety message when the position is within a safety distance threshold away from an area having the safety level higher than the safety level threshold.

17. The method of claim 10, wherein the personal navigation device receiving the safety information from the safety data server is the personal navigation device receiving a safety event corresponding to the position from the safety data server.

18. The method of claim 10, wherein the personal navigation device displaying the safety notification in the user interface of the personal navigation device according to the safety information and the position of the personal navigation device is displaying the safety notification in the user interface of the personal navigation device according to the safety information and the position upon detection of a change in mode of the personal navigation device from driving mode to walking mode.

* * * * *

UNITED STATES PATENT AND TRADEMARK OFFICE
CERTIFICATE OF CORRECTION

PATENT NO. : 8,289,171 B2
APPLICATION NO. : 12/684126
DATED : October 16, 2012
INVENTOR(S) : Simon Dean Morley It is certified that error appears in the above-identified patent and that said Letters Patent is hereby corrected as shown below:

On the title page, item (73), correct the residence of the Assignee from "Huei-Shan Hsiang" to -- Kuei-Shan Hsiang --.

Signed and Sealed this
Twenty-fifth Day of December, 2012

David J. Kappos
*Director of the United States Patent and Trademark Office*